P. A. SHIPLEY & A. WHEELER.
WASHING-MACHINE.
No. 7,118. Reissued May 16, 1876.
FIG. I
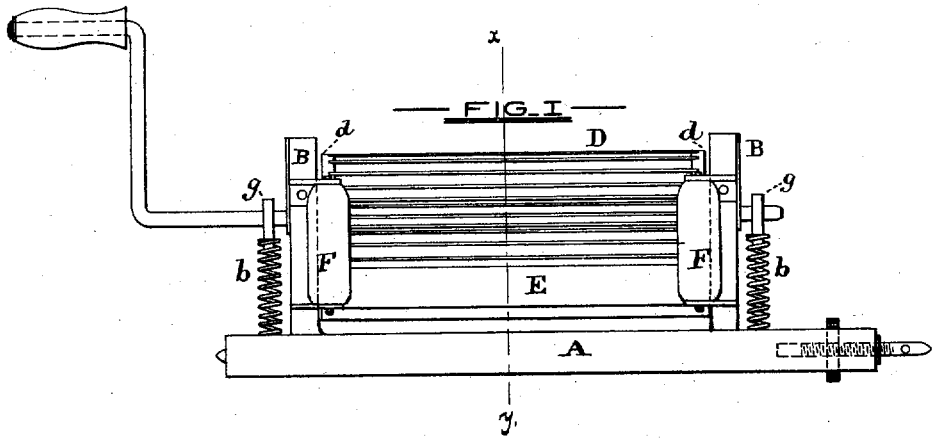
FIG. III
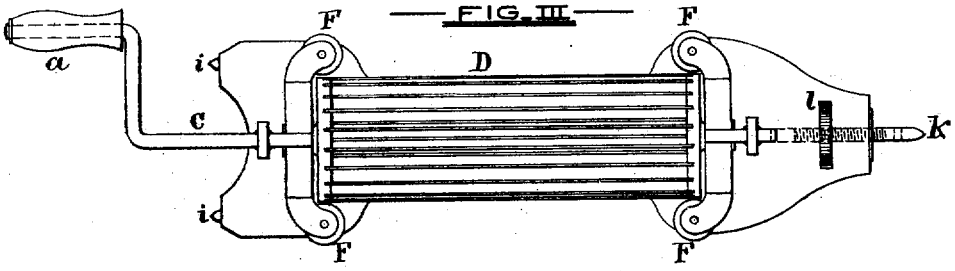
FIG. II
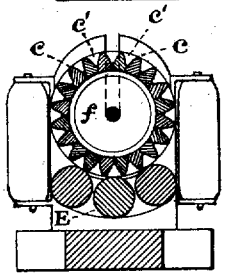
FIG. IV
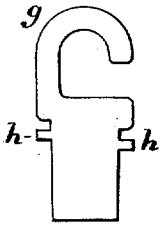
WITNESSES.
H. A. Daniels
J. S. Kellogg
INVENTORS.
Peter A. Shipley &
Abraham Wheeler,
by A. H. W. Howard
Attys.
N. PETERS, PHOTO-LITHOGRAPHER, WASHINGTON, D. C.

UNITED STATES PATENT OFFICE.

PETER A. SHIPLEY AND ABRAHAM WHEELER, OF WOODBERRY, MD.

IMPROVEMENT IN WASHING-MACHINES.

Specification forming part of Letters Patent No. 159,971, dated February 16, 1875; reissue No. 7,118, dated May 16, 1876; application filed April 13, 1876.

*To all whom it may concern:*

Be it known that we, PETER A. SHIPLEY and ABRAHAM WHEELER, both of Woodberry, in the county of Baltimore and State of Maryland, have invented certain Improvements in Washing-Machines, of which the following is a specification, reference being had to the accompanying drawing, forming a part hereof.

Our invention relates to that class of washing-machines in which the machine is adapted to be secured within the wash-tub above the water contained therein, and operated by means of a crank projecting over the side of the tub, the articles to be washed being drawn between rollers and given a forward and backward motion by means of the crank and rollers aforesaid.

In the accompanying drawing, forming a part of this specification, Figure 1 is a side view of the machine, and Fig. 2 a sectional view of the same upon line *x y*. Fig. 3 is a plan of the invention, and Fig. 4 an enlarged view of a portion of the same.

The washing-machine containing our improvements may be described as follows, similar parts in the drawing being indicated by similar letters.

A is a board, of a length less than the interior diameter of the tub to which it is to be applied, and provided with the frames B, fastened thereto at a right angle. The frames B are slotted, the slots extending from the upper edge of the frame to a point nearly central of the same, where they are occupied by the shaft C, which extends through the frames, terminating at one end in a crank, *a*. The shaft C is held to the bottom of the slots by means of spiral springs *b*, which allow the shaft and attachments to be elevated and depressed during the washing operation, as hereinafter described. D is a fluted roller, constructed of strips of wood *c*, which, at their ends, fit between the outer surface of the rings *d* and the triangular projections *c'* on the disks *f*.

This peculiar construction of the roller D adapts it to be readily repaired when worn by continued use, the strips *c* being devoid of any fastenings other than those above described.

The springs before alluded to are connected to the shaft C by means of hooks *g*, one of which is shown on an enlarged scale in Fig. 4.

The projections *h* on the hooks *g* are arranged in such manner as to suit the pitch of the spiral springs *b*, thus allowing the hook to be screwed into the said springs, the projections passing between the coils of the wire. E E are plain rollers, arranged in a circular line concentric with the fluted roller D. The rollers E E have no movement other than the rotary motion transmitted to them by means of the fluted roller D. F F are guard-rollers, to assist in the general efficiency of the machine. The board A is held within the tub by means of the projecting points *i* and the adjustable pointed bolt *k*, which is moved longitudinally by means of the nut *l*.

The method of washing clothes, &c., by means of our invention is as follows: The machine having been secured firmly in the tub, as described, and above the water contained therein, the articles to be washed are passed between the fluted and plain rollers, and made to move rapidly forward and backward by means of the crank. The water absorbed by the clothes while in the tub is thus forced out by the rollers, and the dirt gradually removed without any injurious strain being placed upon the articles.

The fluted roller, being made adjustable by means of the spiral springs, allows all descriptions of fabrics to be washed without injury to themselves or to the machine.

Having thus described our invention, what we claim as new, and wish to secure by Letters Patent of the United States, is—

1. The board A, slotted frames B, provided with the vertical rollers F, shaft C, fluted roller D, spiral springs *b*, hooks *g*, and plain rollers E, constructed and combined in a washing-machine, substantially as herein specified.

2. The strips *c*, in combination with the toothed disks *f* and the plain rings *d*, forming a support for said strips, and triangular projections *c'*, the whole forming the roller D, substantially as specified.

In testimony whereof we have hereunto subscribed our names this 27th day of November, in the year of our Lord 1875.

PETER A. SHIPLEY.
ABRAHAM WHEELER.

Witnesses:
WM. T. HOWARD,
JNO. T. MADDOX.